July 6, 1965  D. B. BADGLEY  3,193,141
DEVICE FOR MEASURING AND DISPENSING VARIABLE AMOUNTS OF LIQUID
Filed Aug. 23, 1963  2 Sheets-Sheet 2

Inventor
Durward B. Badgley
By R.G. Story
Attorney

United States Patent Office 3,193,141
Patented July 6, 1965

3,193,141
DEVICE FOR MEASURING AND DISPENSING VARIABLE AMOUNTS OF LIQUID
Durward B. Badgley, Chicago, Ill., assignor to Swift & Company, Chicago, Ill., a corporation of Illinois
Filed Aug. 23, 1963, Ser. No. 304,096
3 Claims. (Cl. 222—20)

The present invention relates to a liquid measuring and dispensing device, and more specifically is directed to a semiautomatic apparatus for measuring and dispensing specified quantities of liquid, particularly of liquid electrolyte material.

It is often a laboratory and even an industrial production requirement to dispense accurate amounts of liquid material intended to be used in a given process. Usually such amounts vary from time to time in accordance with the requirements of the operation in which the liquid is to be used. One such use which led to the development of the specific embodiment of the invention herein described is the ante-mortem treatment of livestock with a proteolytic enzyme solution intended to tenderize the meat products obtained from such livestock after slaughtering. That process is disclosed in United States Letters Patent No. 2,903,362, issued September 8, 1959, and No. 3,052,551, issued September 4, 1962.

In carrying out that process, a quantity of a proteolytic enzyme solution is injected into the vascular system of each animal before it is slaughtered. The specific amount of enzyme solution introduced in each animal is predicated upon the animal's weight and condition, and also upon the specific nature and strength of the enzyme employed. Accordingly, it is necessary for the operators of the process to determine the quantity of solution necessary for each individual animal and subsequently measure out such quantities from a source of supply.

In the past, the latter practice has required an operator to follow more or less standard laboratory procedure in filling a calibrated burette to a zero reference level with the required solution and then carefully emptying the desired amount from the burette into a beaker or syringe or other suitable receptacle, by gravity flow. In doing this, the operator was required to carefully observe the falling liquid level and quickly close a burette stopcock upon the level reaching a predetermined calibration. Manual regulation was subject to inaccuracies and difficulties because, with gravity flow, it was necessary to have the burette at an elevated height above the collecting receptacle, the latter desirably conveniently disposed with relation to the operator, and optical parallax plus the operator's time of response were negating factors.

Accordingly, it is a principal object of the present invention to provide an improved apparatus for measuring and dispensing variable amounts of liquid.

It is another object of the present invention to provide an improved apparatus for measuring and dispensing variable amounts of liquid wherein the measurement of liquid is accomplished automatically and is not subject to human error.

It is a further object of the present invention to provide an improved semi-automatic apparatus for measuring and dispensing variable amounts of liquid wherein an operator selects the amount of liquid to be dispensed and the measurement and dispensement is accomplished automatically and is not subject to human error.

Generally speaking, the preferred form of the present invention employs a measuring means electrically responsive to the liquid level in a suitable measuring column. Accordingly the device is especially useful with liquid electrolyte material having the property of electrical conductance. The basic apparatus comprises a dispensing means for containing a charge of the liquid material, the lower portion of the dispensing means including a discharge tube and flow control valve. A filling means including a further tube and control valve leading to the dispensing means are connectable with a source of supply of the liquid material. Finally, the measuring means is suspended within the dispensing means, in the liquid, and is attached to a vertically reciprocal member which is movable in accordance with the volume of liquid to be dispensed. The measuring means includes a control means which is connected to operate the aforementioned valves in the discharge and supply tubes.

Further objects and advantages of the present invention will become apparent upon reading the following specification in conjunction with the drawings wherein.

Figure 1:
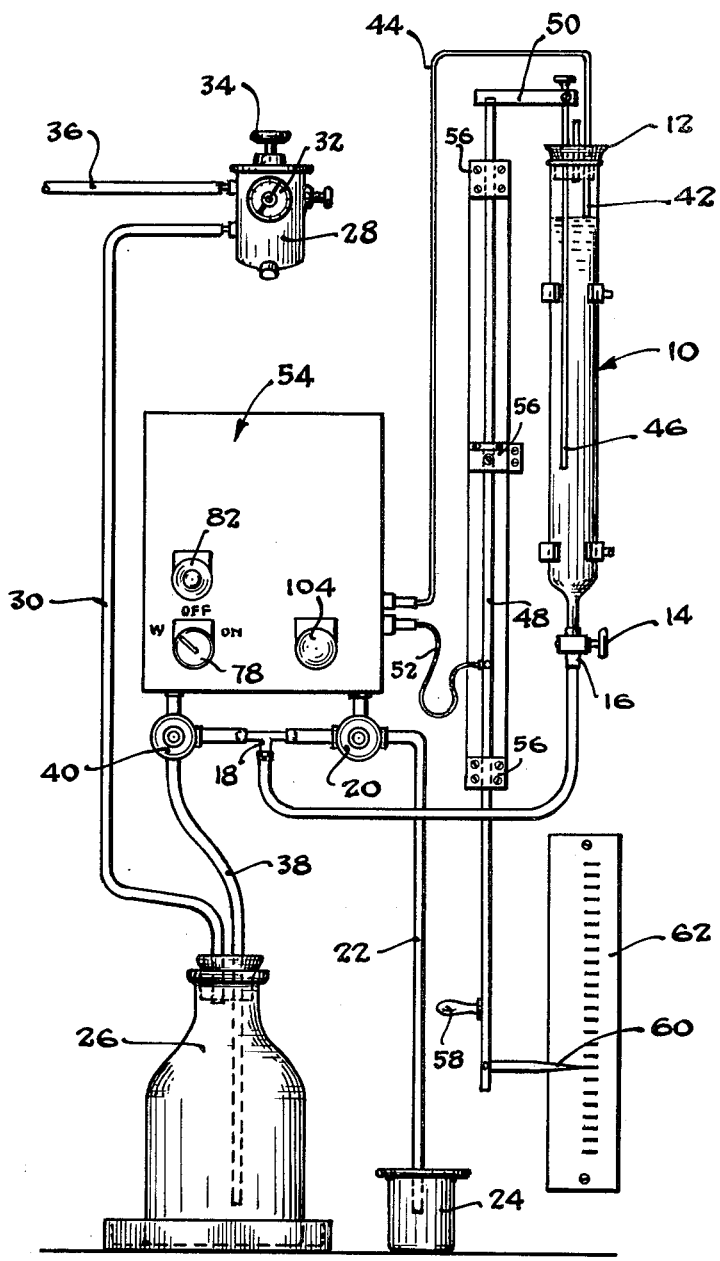
FIGURE 1 is a general view of an embodiment of the present measuring and dispensing apparatus which is manually adjustable to establish the amount of liquid to be dispensed.

A preferred embodiment of the present device is illustrated in FIGURE 1. This apparatus includes liquid dispensing means comprising a measuring column or burette 10 mounted vertically above the operator's eye level on a frame or panel or the like. Preferably the measuring column is made of transparent material such as glass for visual check of the liquid level by the operator. The upper end of the measuring column is closed by a removable plug 12 which is vented to the atmosphere. The lower end of the measuring column 11 terminates in a stopcock 14 and nipple 16. The stopcock 14 is normally left in the open position. The nipple 16, in turn, is connected by rubber hosing or the like to a T tube 18 which is connective with one side of a solenoid operated valve 20 and thence to a discharge tube 22. The discharge tube in turn ends at a lower level conveniently disposed to the placement of a collecting receptacle 24 such as a beaker or syringe or the like.

Provision is also made for charging the measuring column 10 with liquid through the nipple 16 and T tube 18 connected thereto from a reservoir and filling means. A suitable closed supply vessel 26, such as a glass jug or the like, may be disposed beneath the apparatus and is connected to a pressure regulator 28 by an air tube 30 extending from a cap or plug in the vessel. The regulator 28 includes a visual reading gauge 32 and a valve which is manually adjustable by a stem 34. The regulator 28 is in turn connected to a suitable source of gas, such as air, under pressure (not shown) by a hose 36. An operator may readily set the valve of the regulator 28 to place the head space of the vessel 26 under a slight positive pressure of, for instance, about 3 p.s.i.

Liquid in the vessel 26 will thus be forced out of the vessel through a supply tube 38 which extends from the bottom of the vessel upwardly through its closure plug, adjacent the mouth of air tube 30, and into connection with a second solenoid operated valve 40. Valve 40 is also connective with the T tube 18; and thus when valve 20 is closed and valve 40 opened, liquid will be forced from the vessel 26 through the supply tube 38 and into the bottom of the measuring column 10.

A measuring means is located within the dispensing means for detecting presence of the liquid level therein. The measuring means comprises two detecting members, the first being, preferably, a stationary electrode 42 fixed in the plug 12, with the lower end of the electrode disposed at an upper point even with the "zero" level of the measuring column 10. Stationary electrode 42 is in turn connected to a lead wire 44, which will subsequently be explained. The second detecting member is movable to any point lower than the first and is preferably a movable electrode 46 which is reciprocable vertically within the measuring column 10 through an opening in the plug 12 by a positioning means. The lower end of the movable electrode 46 extends below the end of the stationary electrode 42 and is adjustable vertically by way of the upper end thereof being connected to a vertically movable slide bar 48. The upper end of electrode 46 is fastened to one end of a cross piece 50, the other end of which is fastened to the upper end of slide bar 48 where the slide bar 48 and cross piece 50 are electrically conductive a second lead wire 52 is, in turn, attached to the slide bar 48; and both lead wires 44 and 52 are connective with a measuring control means generally 54.

The functional components of the measuring control means 54 are illustrated schematically in FIGURE 3 and will be subsequently explained. However, this item is a commercially available unit, one example of which is the Photoswitch Liquid Level Controller Model 13 DJ 3, sold by the Photoswitch Company and described in their Controls Bulletin DF 583 dated November, 1962.

Since the vertical slide bar 48 provides a part of the electrical connection between the movable electrode 46 and the measuring control means 54, the slide bar is mounted in a plurality of vertically spaced collar bearings 56 which are manufactured from an electrically non-conductive material such as Teflon or the like. The slide bar 48 is also provided with a handle 58, near its lower end, and a pointer 60. Additionally, a suitable scale or chart 62 is fastened to the mounting panel in association with the pointer 60 to indicate to the operator the relative location of the lower end of the movable electrode 46 with respect to the lower end of the stationary electrode 42. Preferably the above described apparatus is mounted in an elevated position so that the pointer 60 and scale 62 are approximately at the eye level of an operator.

The chart 62 may be calibrated directly in cubic measurement or it may be calibrated with respect to a specific operating parameter. However, it will subsequently become clear that the amount of liquid dispensed by the device will be the quantity contained within the measuring column 10 between the levels of the lower ends of movable electrode 46 and the stationary electrode 42. Thus, the volume of liquid to be measured and dispensed may be regulated by raising or lowering the movable electrode 46 through vertical adjustment of the slide bar 48.

Figure 2:
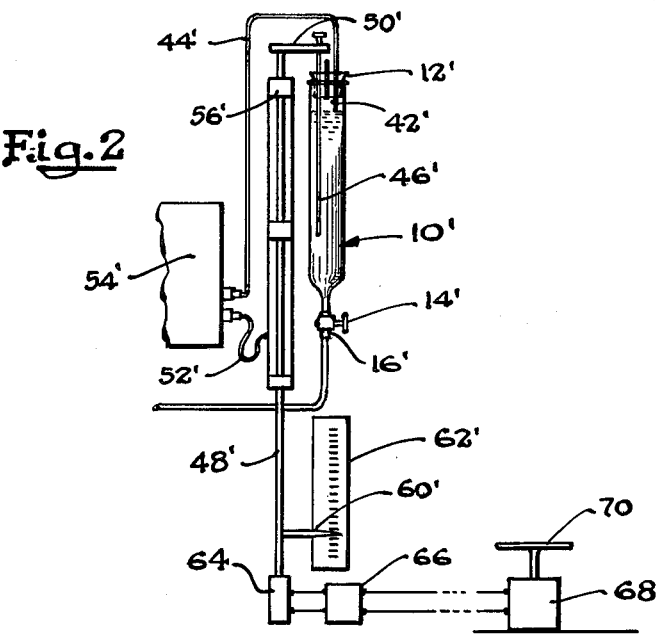
FIGURE 2 is a partial schematic view of a measuring and dispensing apparatus that is automatically adjustable to establish the amount of liquid to be dispensed.

A second embodiment of the present invention which provides for automatically raising or lowering the movable electrode is illustrated schematically in FIGURE 2, wherein elements corresponding to those previously described are identified by like reference characters bearing prime exponents. In the latter apparatus the handle 58 may be omitted from the slide bar 48, and in its place a mechanical controller means generally 64 is connected to the lower end of slide bar 48'. Such controller means may be one of many convenient and well known apparatus such as a pneumatic cylinder, servo, or the like. The controller means 64 is commanded by a receiver means generally 66 connected thereto, which in turn is connected to receive intelligence from a remotely located transducer means generally 68, both of the latter means being selected from several well known apparatus. In operation, the transducer 68 is responsive to a parameter or characteristic in the operation that determines the amount of liquid to be dispensed by the present device. In the process of treating animals, as previously described, the transducer 68 is connected to a livestock scale 70 and transmits an indication of the weight of an animal to the receiver means 66 which in turn causes the controller means 64 to raise or lower the slide bar 48' and movable electrode 46' to a position which is a function of the animal weight. It will be understood by those skilled in the art that commercially available elements sometimes incorporates the receiver element bodily within the controller means.

Figure 3:
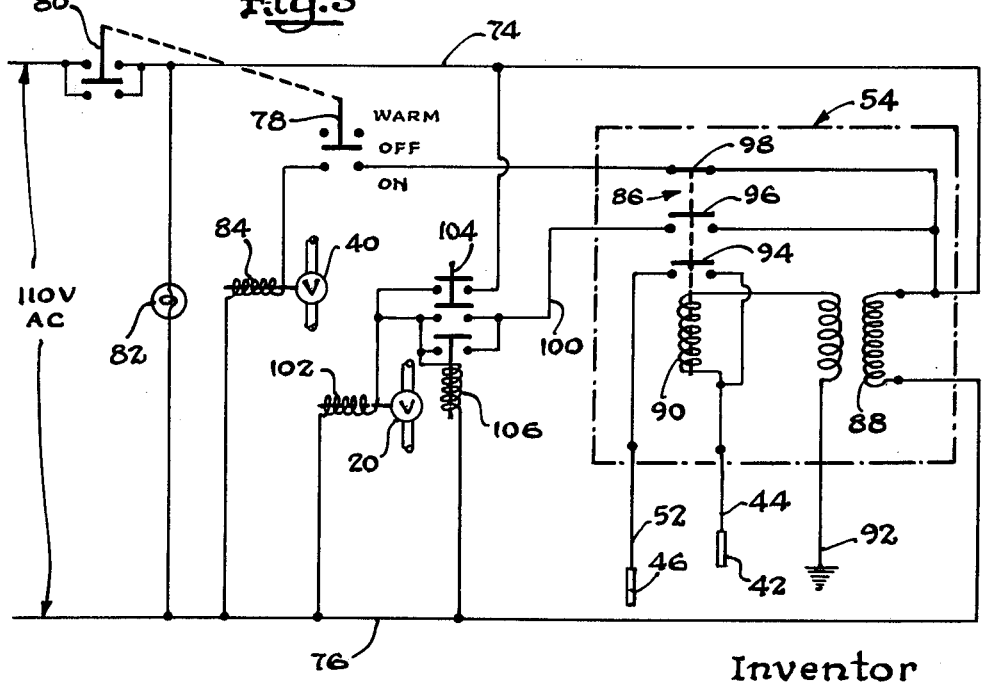
FIGURE 3 is a schematic wiring diagram of the control circuit for the apparatus of FIGURE 1.

The electrical circuit for controlling the described device is shown in FIGURE 3. This circuit includes the aformentioned measuring control means generally 54 which is represented only schematically and functionally within the portion enclosed by broken lines in FIGURE 3. In the circuit two power lines 74, 76 are connected across a convenient source of house current and are both connected to the controller 54. Electrical current is connected or disconnected through a control switch 78 which is mechanically coupled with a captive line switch 80, the latter placed in power line 74. Both the control switch 78 and captive line switch 80 have three positions, the first and third of which in the line switch 80 close the circuit between the source of power and controller 54, while the intermediate position is open. An indicator lamp 82 is placed across power lines 74, 76 so as to be illuminated when the line switch 80 is in either of its closed positions. The control switch 78 is always open in the first and second positions, and the third position is connected between one lead of a solenoid coil 84, for operating valve 40, and a relay generally 86 on the control means 54. The opposite lead of the solenoid coil 84 is connected to the power line 76.

A stepdown transformer 88 is located within the control means generally 54; and the primary coil of the latter is connected across power lines 74 and 76. In the identified commercial unit the secondary coil of the transformer 88 develops a maximum of approximately 11.5 volts and additional elements convert the power to direct current. One end of the secondary coil is connected to one side of a coil 90 which actuates a relay generally 86. The opposite ends of the secondary coil is connected to a ground 92 which must be in electrical communication with the liquid in the measuring column 10, and preferably is connected at one or both of the valves 20 and 40. The remaining side of coil 90 is connected directly through lead wire 44 to the stationary electrode 42 in the upper end of the measuring column 10. The relay generally 86 contains three relay switches 94, 96 and 98. The first relay switch 94 is normally open (when coil 90 is not energized) and is connectable between the electrode leads 44 and 52, the latter being electrically connected with the adjustable electrode 46. The second relay switch 96 is also normally open and is connectable between power line 74 and a wire 100. The third relay switch 98 is normally closed (when the coil 90 is not energized) and connects the control switch 78 with the power line 74.

The aforementioned wire 100 is in turn connected between the second relay switch 96 and a solenoid 102 (operating valve 20) through a normally open starting switch 104. The latter starting switch 104 is double acting and spring loaded to the open position. It also is connected to provide a second path directly from the power line 74 to the solenoid 102. Additionally, the starting switch 104 is connected to complete a circuit across a holding relay 106 which, when energized, will maintain an electrical connection between wire 100 and solenoid 102.

In operation, an operator first turns the control switch 78 to the first or warming position to allow the internal elements of the control means 54 to reach operating temperature. He then determines the quantity of fluid to be measured and dispensed, and adjusts the slide bar 48 to bring the pointer 60 opposite the appropriate calibration on chart 62. Thereafter the control switch 78 is turned to the on position which energizes the solenoid 84 to open valve 40 allowing fluid to be forced from the vessel 26 into the measuring column 10.

Solenoid 84 will hold valve 40 open until the liquid level rises into contact with the stationary electrode 42, at which time an electrical path will be completed through the latter electrode, the liquid, ground 92 and the secondary winding of the transformer 88 to the relay coil 90. At that instant the relay switch 98 will be opened thereby de-energizing solenoid 84 causing the valve 40 to close and stop the flow of liquid into the measuring column 10. At the same instant relay switches 94 and 96 will be closed placing the movable electrode 46 in the aforementioned electrical path to coil 90, and connecting the wire 100 to the power line 74, respectively.

Thereafter the operator, when a suitable receptacle has been placed beneath the discharge tube 22, momentarily closes the starting switch 104, energizing solenoid 102 to open valve 20, and also energizing the holding relay 106. The switch of relay 106 closes a holding circuit between the solenoid 102 and wire 100 maintaining the solenoid energized when the starting switch 104 is released. Thus, fluid is permitted to flow by gravity from the measuring column 10 through valve 20 and the discharge tube 22 into the receptacle 24. When the liquid level falls away from the stationary electrode 42, the electrical path to the relay coil 90 will be maintained through ground and the movable electrode 46. However, at the moment the liquid level passes the end of the electrode 46, the path will be broken, de-energizing coil 90 and allowing relay switches 94, 96 and 98 to resume their original portions, switch 96 opening to de-energize the solenoid 102 of valve 20 and the holding relay 106. Thus the valve 20 will immediately close to stop the flow of fluid into the discharge tube 22.

At that instant relay switch 98 is again closed and, so long as the control switch 78 remains closed, solenoid 84 will be re-energized, opening valve 40 to refill the measuring column 10.

The above procedures are repeated indefinitely with the measuring column 10 being automatically refilled after each desired quantity of fluid is dispensed. The operator need only pause long enough to refill the liquid storage vessel 26 when required. Additionally, when it is desired to close down or clean the apparatus, the operator merely turns the control switch 78 to the first or warming position and manually holds the starting switch 104 closed. The latter completes a direct connection between the power line 74 and solenoid 84, thereby energizing the latter throughout the period that the switch is held closed. When the burette 10 and discharge tube 22 are completely empty, the starting switch 104 is released and the control switch 78 is turned to the off position.

Obviously many modifications and variations of the invention as hereinbefore set forth may be made without departing from the spirit and scope thereof, and therefore only such limitations should be imposed as are indicated in the appended claims.

I claim:

1. An improved device for dispensing measured quantities of liquid, said device comprising; a dispensing means for holding and discharging a body of liquid; a closed vessel for containing a supply of said liquid; gas pressure means connected to said vessel and applying a constant positive pressure therein; a supply tube connecting said vessel and said dispensing means; a valve in said supply tube for controlling the flow of liquid therethrough; a pair of detecting electrodes within said dispensing means, one of said electrodes being fixed at an upper point in said dispensing means and electrically connecting to close said valve to stop the supply of liquid when the level thereof reaches said upper point, the other of said electrodes being movable vertically with respect to said one electrode to a selectable lower point whereby a known variable volume of said dispensing means is measured between said electrodes, said other electrode member being electrically connected to terminate the discharge of liquid from said dispensing means and causing said valve to open to supply additional liquid thereto upon the liquid level falling to said lower point; and positioning means located below and outside the said dispensing means and connected to said other electrode, said positioning means being operable to move said other electrode to a desired lower point.

2. An improved device for dispensing by gravity measured quantities of liquid electrolyte material, said device comprising: a vertical measuring column for containing a body of liquid; a T connector at the bottom of said measuring column; a first solenoid valve connected between one side of said T connector and a discharge tube; a second solenoid valve connected to the opposite side of said T connector; a closed vessel connected to said second valve, said vessel normally containing a supply of liquid for said measuring column; gas pressure means connected to said vessel for constantly exerting a positive pressure and thereby forcing liquid therefrom to said valve and thence to said measuring column; a first short electrode fixed within the upper end of said measuring column, the end of said first electrode positioned at a zero reference point; a second long electrode reciprocable vertically within said measuring column and extending from the top thereof downwardly to an adjustable point below said zero reference point; positioning means located outside and below said measuring column and connected to said second electrode, said positioning means being operable to move said second electrode to a point defining a desired volume within said column and between said zero and adjustable point; and a liquid level controller electrically connected to said first and second electrodes and to liquid within said column, said controller also being connected to operate said first and second solenoid valves to hold open said first valve upon actuation of an operator and so long as liquid is in contact with said second electrode, to close said first valve and simultaneously open said second valve upon the level of liquid in said column falling below said adjustable point, and to close said second valve upon the liquid level in said column rising to said zero reference point.

3. The device of claim 2 wherein the positioning means is connected to a mechanical controller means and is operated automatically by said mechanical controller means which is connected to receive signals from a transducer means.

References Cited by the Examiner

UNITED STATES PATENTS

| 1,201,970 | 10/16 | Johnson | 222—14 X |
| 1,820,981 | 9/31 | Fever | 222—14 X |
| 2,078,479 | 4/37 | Briggs | 222—14 X |
| 3,014,620 | 12/61 | Moore | 222—394 |
| 3,129,730 | 4/64 | Simon | 222—394 X |

FOREIGN PATENTS 615,146    1/49    Great Britain.

LOUIS J. DEMBO, *Primary Examiner.*

UNITED STATES PATENT OFFICE
CERTIFICATE OF CORRECTION

Patent No. 3,193,141                          July 6, 1965

Durward B. Badgley

It is hereby certified that error appears in the above numbered patent requiring correction and that the said Letters Patent should read as corrected below.

Column 5, line 24, for "portions" read -- positions --; line 63, for "connecting" read -- connected --.

Signed and sealed this 23rd day of November 1965.

(SEAL)
Attest:

ERNEST W. SWIDER
Attesting Officer

EDWARD J. BRENNER
Commissioner of Patents